(12) United States Patent
Randhawa et al.

(10) Patent No.: US 10,223,745 B1
(45) Date of Patent: Mar. 5, 2019

(54) ASSESSING ENTERPRISE CREDIT QUALITY

(71) Applicants: Himmat Singh Randhawa, Mountain View, CA (US); Yichen Jennifer Wu, Fremont, CA (US); Kevin Reagan Jacques, Cupertino, CA (US); Lakshmi Venkatesan, San Francisco, CA (US)

(72) Inventors: Himmat Singh Randhawa, Mountain View, CA (US); Yichen Jennifer Wu, Fremont, CA (US); Kevin Reagan Jacques, Cupertino, CA (US); Lakshmi Venkatesan, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/015,858

(22) Filed: Aug. 30, 2013

(51) Int. Cl.
*G06Q 40/02* (2012.01)
*G06Q 40/00* (2012.01)
*G06Q 30/00* (2012.01)

(52) U.S. Cl.
CPC ........... *G06Q 40/025* (2013.01); *G06Q 30/00* (2013.01); *G06Q 40/00* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 5,274,547 A | * | 12/1993 | Zoffel et al. | 705/38 |
| 6,052,674 A | * | 4/2000 | Zervides et al. | 705/40 |
| 7,580,884 B2 | * | 8/2009 | Cook | 705/38 |
| 2014/0278730 A1 | * | 9/2014 | Muhart | G06Q 10/0635 705/7.28 |

OTHER PUBLICATIONS

BBB Review Microsoft (http://www.bbb.org/western-washington/business-reviews/computer-software-publishers-and-developers/microsoft-corporation-in-redmond-wa-501264).*

* cited by examiner

*Primary Examiner* — Joseph W. King
(74) *Attorney, Agent, or Firm* — Ferguson Braswell Fraser Kubasta PC

(57) ABSTRACT

A method for generating a credit risk score of a business entity. The method includes identifying a business management application (BMA) used by the business entity and a plurality of trading partners of the business entity, selecting, from the plurality of trading partners, a plurality of selected trading partners based on a pre-determined business activity measure of each of the plurality of trading partners, obtaining, from the BMA, a plurality of invoice payment records of the business entity paying the plurality of selected trading partners, analyzing, by a computer processor, the plurality of invoice payment records to generate a plurality of invoice payment statistics representing payment behavior of the business entity, and generating, by the computer processor and using a pre-determined formula, the credit risk score based on the plurality of invoice payment statistics.

18 Claims, 7 Drawing Sheets

SCREENSHOT A 310

BEST ACCOUNTING | John's Plumbing Service

Alert

NEW CUSTOMER ALERT LIST 311

| Customer Name | Balance | Trade Score |
|---|---|---|
| ABC Enterprise  ENTRY A 312a | $1295 | 54 |
| Large Technology Corp  ENTRY B 312b | $3500 | 30 (!) |
| Random Mid-size Manufacturing | $485 | N/A |
| AAA Clothing Co | $0 | 78 |
| BBB Large Enterprise | $0 | 63 |
| Truck Dealership | $0 | N/A |

ALERT: There's been a change in Large Technology Corp's Trade Score 313

*FIG. 3A*

SCREENSHOT B
320

BEST ACCOUNTING    Enterprise Trade Quality    John's Plumbing Service

COMPANY INFORMATION 321

ABC Enterprise
- Address: 1234 ABC St, City, Zip, State
- Phone: (123)456-7890
- Website: www.abc.com
- Email: Service@abc.com

CREDIT RISK SCORE INFORMATION 322

Trade score    54 / 100

ABC Enterprise is in the 47th percentile of businesses in similar industry

ACTION MENU 324

Want to search for another company?

Search (e.g., XYZ Corp)

[Submit]

Do you do business with ABC Enterprise too? You can help us make this product better and more accurate by sharing your experience.

[Show me how]

Want to talk to other small businesses that have done business with ABC Enterprise? Let us help you do that.

[Connect me]

CREDIT RISK SCORE INFORMATION DETAILS 323

More details

On time payment
- 60% of ABC Enterprise' invoices were paid on time in the last 12 months
- 20% of invoices were between 1 and 30 days late
- 15% of invoices were between 31 and 90 days late
- 5% of invoices were never paid

Payment disputes
- 18% of invoices were disputed
- 10 companies have filed complaints (see complaints)

Dun & Bradstreet
- D&B Rating: 3A2
- Paydex Score: 60

*FIG. 3B*

ASSESSING ENTERPRISE CREDIT QUALITY

BACKGROUND

Businesses often lack visibility on whether or not a customer will pay them on time. Generally, a small business (SMB) lacks influence over its larger trading partners (e.g., enterprises) on the partners' business practices (e.g., how fast they pay). As a result, enterprises are typically the slowest paying customers that SMBs transact with, leading to difficult cash flow situations for the SMBs.

SUMMARY

In general, in one aspect, the invention relates to a method for generating a credit risk score of a business entity. The method includes identifying a business management application (BMA) used by the business entity and a plurality of trading partners of the business entity, selecting, from the plurality of trading partners, a plurality of selected trading partners based on a pre-determined business activity measure of each of the plurality of trading partners, obtaining, from the BMA, a plurality of invoice payment records of the business entity paying the plurality of selected trading partners, analyzing, by a computer processor, the plurality of invoice payment records to generate a plurality of invoice payment statistics representing payment behavior of the business entity, and generating, by the computer processor and using a pre-determined formula, the credit risk score based on the plurality of invoice payment statistics.

In general, in one aspect, the invention relates to a system for generating a credit risk score of a business entity. The system includes (1) a business management application (BMA) used by the business entity and a plurality of trading partners of the business entity, (2) a computer processor, (3) memory storing instructions executable by the processor, where the instructions include (i) an invoice payment analyzer configured to select, from the plurality of trading partners, a plurality of selected trading partners based on a pre-determined business activity measure of each of the plurality of trading partners, obtain, from the BMA, a plurality of invoice payment records of the business entity paying the plurality of selected trading partners, and analyze the plurality of invoice payment records to generate a plurality of invoice payment statistics representing payment behavior of the business entity, and (ii) a credit risk score generator configured to generate, using a pre-determined formula, the credit risk score based on the plurality of invoice payment statistics, and (3) a repository configured to store the plurality of invoice payment statistics and the credit risk score.

In general, in one aspect, the invention relates to a non-transitory computer readable medium storing instructions for generating a credit risk score of a business entity. The instructions, when executed by a computer processor, include functionality for identifying a business management application (BMA) used by the business entity and a plurality of trading partners of the business entity, selecting, from the plurality of trading partners, a plurality of selected trading partners based on a pre-determined business activity measure of each of the plurality of trading partners, obtaining, from the BMA, a plurality of invoice payment records of the business entity paying the plurality of selected trading partners, analyzing the plurality of invoice payment records to generate a plurality of invoice payment statistics representing payment behavior of the business entity, and generating, using a pre-determined formula, the credit risk score based on the plurality of invoice payment statistics.

Other aspects of the invention will be apparent from the following description and the appended claims.

BRIEF DESCRIPTION OF DRAWINGS

FIGS. 3A, 3B, and 3C show an example in accordance with one or more embodiments of the invention.

DETAILED DESCRIPTION

Figure 1:
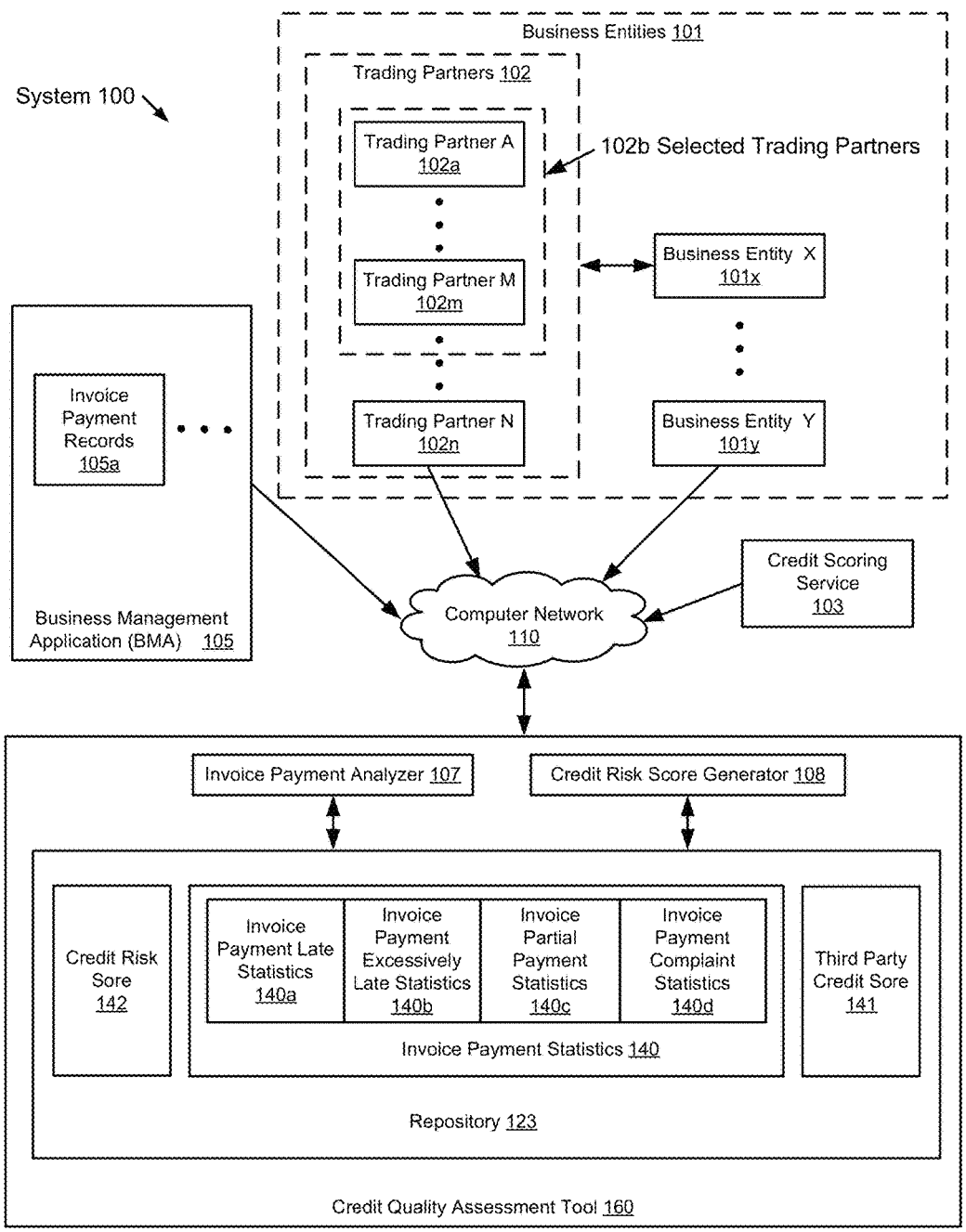
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and computer readable medium to assess enterprise credit quality with a business entity. The enterprise credit quality indicates a risk of doing business with the business entity. In one or more embodiments, the enterprise credit quality is represented by a credit risk score that is generated based on invoice payment statistics and other publically available information of the business entity.

FIG. 1 shows a block diagram of a system (100) for assessing enterprise credit quality in accordance with one or more embodiments of the invention. Specifically, the system (100) includes business entities (101), a business management application BMA (105) used by any one of the business entities (101), a credit scoring service (103), and a credit quality assessment tool (160) that are coupled via a computer network (110). In one or more embodiments of the invention, the credit quality assessment tool (160), or a portion thereof, may be integrated with the BMA (105). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the computer network (110) may include a cellular phone network, a wide area network, a local area network, a public switched telephone network (PSTN), or any other suitable network that facilitates the exchange of information from one part of the network to another. In one or more embodiments, the computer network (110) is coupled to or overlaps with the Internet.

In one or more embodiments of the invention, the business entities (101) include business entity X (101x), business entity Y (101y), etc., and additional business entities referred to as trading partners (102). In one or more embodiments, the trading partners (102) include those business entities that have engaged in business transactions with the business entity X (101x). In particular, the trading partners (102) include customers and/or vendors of the business entity X (101x), such as the trading partner A (102a), trading partner M (102m), trading partner N (102n), etc. A portion of the trading partners (102) meeting certain criteria (described later) are collectively referred to as the selected trading partners (102b). Each of the business entity X (101x), business entity Y (101y), trading partner A (102a), trading partner M (102m), trading partner N (102n), etc. is referred to as a member of the business entities (101), or simply referred to as a business entity.

In one or more embodiments, each of the business entities (e.g., any of business entity X (101x), business entity Y (101y), trading partner A (102a), trading partner M (102m), trading partner N (102n), etc.), the BMA (105), and the credit quality assessment tool (160) may include any computing device configured with computing, data storage, and network communication functionalities.

In one or more embodiments of the invention, the BMA (105) may be an accounting application or any business management application configured with functionality to generate, manage, track, and/or otherwise access invoice payment information (e.g., invoice payment records (105a)) of its users. In one or more embodiments, the BMA (105) is provided by an application service provider, such as software as a service (SaaS). For example, the BMA (105) may be operated by the application service provider (ASP) and accessed by the business entities (e.g., business entity X (101x), business entity Y (101y), trading partner A (102a), trading partner M (102m), trading partner N (102n), etc.) on a subscription basis.

In one or more embodiments, the invoice payment records (105a) are generated in response to one or more transactions conducted between members of the business entities (101). An invoice is a commercial document issued by a seller to a buyer, indicating the goods, quantities, and agreed prices for goods or services the seller has provided the buyer. An invoice usually also includes a payment term, which describes payment conditions agreed upon between the seller and buyer of the transaction. Payment due date is a common payment condition included in the payment term. Typical payment due date may be 30 days, 45 days, 60 days, etc. after delivery and acceptance of the purchased goods. Corresponding payment terms are referred to as net 30, net 45, net 60, etc., respectively.

In one or more embodiments, a record in the invoice payment records (105a) may include information regarding invoice issuing date, invoiced amount, invoice payment date(s), invoice payment amount(s), customer, vendor, merchandise information, and other relevant information. Note that a particular invoice may be associated with multiple partial payments towards the total invoiced amount. In one or more embodiments, records available from the BMA (105) are filtered based on one or more criteria, such as based on the business entity receiving the invoice as a customer in a transaction. For example, the invoice payment records (105a) may correspond to invoices received by the business entity X (101x), as a customer, from all or a portion of the trading partners (102) as vendors of the business entity X (101x). In other words, the invoice payment records (105a) correspond to the business entity X (101x) paying its trading partners as vendors.

In one or more embodiments of the invention, the credit quality assessment tool (160) includes an invoice payment analyzer (107), a credit score generator (108), and a repository (123) for storing intermediate data and resultant outputs of these two modules. As shown in FIG. 1, the repository (123) stores the invoice payment statistics (140), the third party credit risk score (141), and the credit risk score (142). In one or more embodiments, the repository (123) may include a disk drive storage device, a semiconductor storage device, other suitable computer data storage device, or combinations thereof. In one or more embodiments, content stored in the repository (123) may be a data file, a linked list, a data sequence, a database, a graphical representation, or any other suitable data structure.

In one or more embodiments, the invoice payment analyzer (107) is configured to select a portion of the trading partners (102) as the selected trading partners (102b) based on a pre-determined business activity measure of each of the trading partners A (102a). For example, the pre-determined business activity measure may represent a revenue amount, number of purchase orders generated, number of invoices paid, etc. during a periodic time period (e.g., a month, quarter, a year, etc.). In another example, the pre-determined business activity measure may represent an employee count, facility size, or other measure of business size. In one or more embodiments, the pre-determined business activity measure of each of the selected trading partners (102b) is less than a pre-determined SMB threshold. Accordingly, each of the selected trading partners (102b) is referred to as a SMB based on the pre-determined business activity measure and the SMB threshold.

In one or more embodiments, the invoice payment analyzer (107) is configured to obtain and analyze, from the BMA (105), the invoice payment records (105a) of the business entity X (101x) paying the selected trading partners (102b). For example, the invoice payment records (105a) may correspond to a particular time period, such as the most recent month, quarter, etc. The results of such analysis are stored in the repository (123) as the invoice payment statistics (140). In one or more embodiments, the invoice payment statistics (140) represent payment behavior of the business entity X (101x).

In one or more embodiments, the invoice payment statistics (140) include the invoice payment late statistics (140a), which is a statistical measure of a late portion of the invoice payment records (105a) having a paid late status based on a pre-determined paid late criterion, such as a past due time period. For example, the invoice payment late statistics (140a) may be a percentile, a fraction, a count, etc. of how many invoices are paid late and/or how many trading partners are being paid late. By way of an example, paying late may refer to 30 days past due, 60 days past due, 90 days past due, 120 days past due, etc. In addition, a trading partner being paid late may refer to the number of late payments (or a fraction of late payments based on total number of invoices) to the trading partner exceeding a pre-determined threshold, such as 20 late payments per month, 30% of invoices being paid late, etc. An example of the invoice payment late statistics (140a) is described in reference to FIG. 3B below.

In one or more embodiments, the invoice payment statistics (140) include the invoice payment excessively late statistics (140b), which is a statistical measure of an excessively late portion of the invoice payment records (105a) having a paid excessively late status based on a pre-determined excessively late criterion, such as an excessive past due time period. For example, the invoice payment excessively late statistics (140b) may be a percentile, a fraction, a count, etc. of how many invoices and/or how many trading partners are paid excessively late. In one or more embodiments, the excessive past due time period is a multiple of the past due time period. As an example, paying late may refer to 30 days past due, while paying excessively late may refer to 60 days past due. In another example, paying late may refer to 30 days past due, while paying excessively late may refer to 60 days, 90 day, or 120 day past due. An example of the invoice payment excessive late statistics (140b) is described in reference to FIG. 3B below.

In one or more embodiments, the invoice payment statistics (140) include the invoice partial payment statistics (140c), which is a statistical measure of a partially paid portion of the invoice payment records (105a) having a partially paid status based on a pre-determined partially paid criterion, such as a number of partial payments received after the due date toward a single invoice, a percent of invoiced amount in a partial payment received after the due date, etc. For example, the invoice partial payment statistics (140c) may be a percentile, a fraction, a count, etc. of how many invoices and/or how many trading partners are paid after the due date using more than a pre-determined number of partial payments for a single invoice. By way of an example, paying using partial payment may refer to using more than a single payment or using more than an accepted number of payments to complete paying the total invoiced amount of a single invoice after the due date.

In one or more embodiments, the invoice payment statistics (140) include the invoice payment complaint statistics (140d), which is a statistical measure of a complaint portion of the invoice payment records (105a) having a complaint status based on a pre-determined complaint criterion, such as a number of complaints, a level of complaint escalation, a number of trading partners filing a complaint, etc. For example, the invoice payment complaint statistics (140d) may be a percentile, a fraction, a count, etc. of how many invoice complaints are reported and/or how many trading partners have filed complaints. An example of the invoice payment complaint statistics (140d) is described in reference to FIG. 3B below.

In one or more embodiments, the invoice payment analyzer (107) is further configured to obtain, from the BMA (105a), the pre-determined business activity measure of the business entity X (101x). As noted above, the pre-determined business activity measure may represent a revenue amount, number of purchase orders generated, number of invoices paid, etc. during a periodic time period (e.g., a month, quarter, a year, etc.), or represent an employee count, facility size, or other measure of business size. In one or more embodiments, the pre-determined business activity measure of each of the business entity X (101x) exceeds a pre-determined large business entity threshold. Accordingly, business entity X (101x) is referred to as a large business entity based on the pre-determined business activity measure and the large business entity threshold. In one or more embodiments, the invoice payment statistics (140) is generated for the scenario of a large business entity customer paying SMB vendors.

Figure 5:
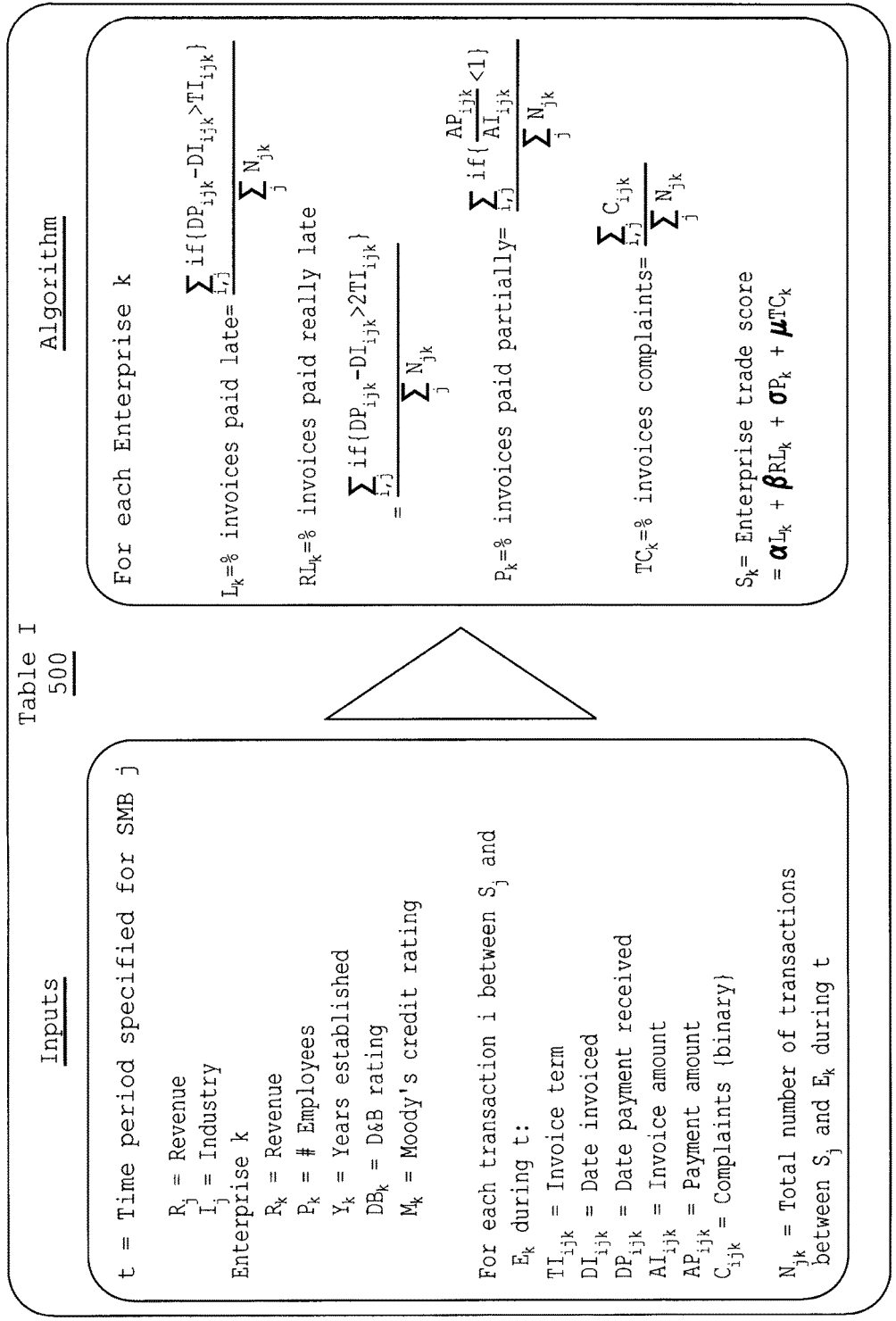
FIG. 5 shows a table in accordance with one or more embodiments of the invention.

In one or more embodiments, the credit risk score generator (108) is configured to generate, using a pre-determined formula, the credit risk score (142) based on one or more elements of the invoice payment statistics (140). In one or more embodiments, the credit risk score (142) represents a historical level of payment issues associated with the business entity X (101x). In one or more embodiments, the credit risk score (142) is used as a predication of likely risk associated with doing business with the business entity X (101x). In one or more embodiments, the credit risk score (142) may be a numerical number, a percentage, a letter grade, a ranking, a rating, or in other suitable format. In one or more embodiments, the credit risk score generator (108) is further configured to obtain, from the credit scoring service (103), the third party credit score (141) of the business entity X (101x). In such embodiments, the credit risk score (142) is calculated using the pre-determined formula further based on the third party credit score (141). For example, the credit scoring service (103) may be the Dun & Bradstreet, Inc. that licenses information on businesses and corporations for use in credit decisions, business-to-business marketing and supply chain management. In this example, the third party credit score (141) is the D&B rating known to those skilled in the art. An example of the pre-determined formula used to calculate the credit risk score (142) is described in TABLE I (500) of FIG. 5 (discussed below).

Figure 2:
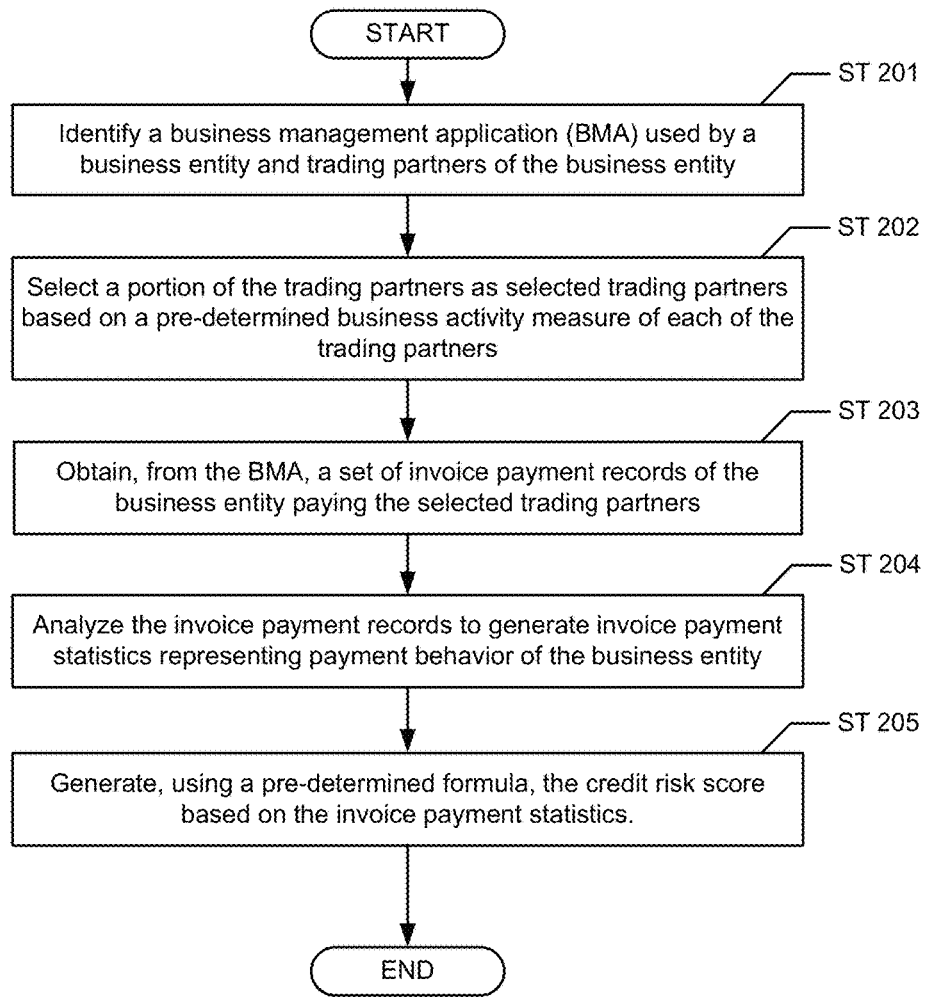
FIG. 2 shows a flow chart of a method in accordance with one or more embodiments of the invention.

FIG. 2 shows a flow chart for assessing enterprise credit quality in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially in Step 201, a business management application (BMA) used by a number of business entity users is identified. In one or more embodiments of the invention, the BMA may be an accounting application or any business management application configured with functionality to generate, manage, track, and/or otherwise access invoice payment information of its business entity users. In one or more embodiments, the BMA is provided by an application service provider, such as software as a service (SaaS). For example, the BMA may be operated by the application service provider (ASP) and accessed by the business entity users via a computer network (e.g., Internet) on a subscription basis. In one or more embodiments, the business entity users include a particular business entity and its trading partners. In particular, the particular business entity and its trading partners have engaged in business transactions. For example, the particular business entity may be a customer of its trading partners. Typically, the particular business entity receives invoices from its trading partners and pays its trading partners based on invoice payment terms, such as net 30 days, net 45 days, net 60 days, etc. as described above. In one or more embodiments, the business entity users use the BMA to process invoices for billing their customers or paying their vendors.

In Step 202, certain trading partners (referred to as selected trading partners) are selected from the trading partners of the particular business entity. In one or more embodiments, the selected trading partners are selected based on a pre-determined business activity measure of each trading partner. For example, the pre-determined business activity measure may represent a revenue amount, number of purchase orders generated, number of invoices paid, etc. during a periodic time period (e.g., a month, quarter, a year, etc.). In another example, the pre-determined business activity measure may represent an employee count, facility size, or other measure of business size. In one or more embodiments, the pre-determined business activity measure of each of the selected trading partners is less than a pre-determined SMB threshold. Accordingly, each of the selected trading partners is referred to as a SMB based on the pre-determined business activity measure and the SMB threshold. In one or more embodiments, the pre-determined business activity measure of the particular business entity X exceeds a pre-determined large business entity threshold. Accordingly, the particular business entity is referred to as a large business entity based on the pre-determined business activity measure and the large business entity threshold.

In Step 203, invoice payment records of the particular business entity are obtained from the BMA. In one or more embodiments, a record in the invoice payment records may include information regarding invoice issuing date, invoiced amount, invoice payment date(s), invoice payment amount(s), customer, vendor, merchandise information, and other relevant information. In one or more embodiments, records available from the BMA are filtered based on one or more criteria. For example, the obtained invoice payment records may correspond to the particular business entity as a customer/buyer paying its selected trading partners as vendors/sellers. As noted above, in one or more embodiments, the particular business entity is a large business entity while its selected trading partners are SMBs. In such embodiments, the invoice payment records are filtered for the scenario of a large business entity customer/buyer paying SMB vendors/sellers during a particular time period, such as the most recent month, quarter, etc.

In Step 204, the invoice payment records are analyzed to generate invoice payment statistics representing payment behavior of the particular business entity.

In one or more embodiments, the invoice payment records are analyzed to identify a late portion of the invoice payment records having a paid late status based on a pre-determined paid late criterion, such as a past due time period. For example, the invoice payment late statistics may be a percentile, a fraction, a count, etc. of how many invoices are paid late and/or how many trading partners are being paid late. By way of an example, paying late may refer to 30 days past due, 60 days past due, 90 days past due, 120 days past due, etc. In addition, a trading partner being paid late may refer to the number of late payments (or a fraction of late payments based on total number of invoices) to the trading partner exceeding a pre-determined threshold, such as 20 late payments per month, 30% of invoices being paid late, etc. An example of the invoice payment late statistics is described in reference to FIG. 3B below.

In one or more embodiments, the invoice payment records are analyzed to identify an excessively late portion of the invoice payment records (105a) having a paid excessively late status based on a pre-determined excessively late criterion, such as an excessive past due time period. For example, the excessively late statistics may be a percentile, a fraction, a count, etc. of how many invoices and/or how many trading partners are paid excessively late. In one or more embodiments, the excessive past due time period is a multiple of the past due time period. As an example, paying late may refer to 30 days past due, while paying excessively late may refer to 60 days past due. In another example, paying late may refer to 30 days past due, while paying excessively late may refer to 60 days, 90 day, or 120 day past due. An example of the invoice payment excessively late statistics is described in reference to FIG. 3B below.

In one or more embodiments, the invoice payment records are analyzed to identify a partially paid portion of the invoice payment records having a partially paid status based on a pre-determined partially paid criterion, such as a number of partial payments received after the due date toward a single invoice, a percent of invoiced amount in a partial payment received after the due date, etc. For example, the invoice partial payment statistics may be a percentile, a fraction, a count, etc. of how many invoices and/or how many trading partners are paid after the due date using more than a pre-determined number of partial payments for a single invoice. By way of an example, paying using partial payment may refer to using more than a single payment or using more than an accepted number of payments to complete paying the total invoiced amount of a single invoice after the due date.

In one or more embodiments, the invoice payment records are analyzed to identify a complaint portion of the invoice payment records having a complaint status based on a pre-determined complaint criterion, such as a number of complaints, a level of complaint escalation, a number of trading partners filing a complaint, etc. For example, the invoice payment complaint statistics may be a percentile, a fraction, a count, etc. of how many invoice complaints are reported and/or how many trading partners have filed complaints. An example of the invoice payment complaint statistics is described in reference to FIG. 3B below.

In Step 205, the credit risk score is generated based on the invoice payment statistics using a pre-determined formula. In other words, one or more of the invoice payment statistics are used as inputs to the pre-determined formula for calculating the credit risk score. In one or more embodiments, a third party generated credit score (e.g., D&B rating) of the business entity may be obtained from a credit scoring service (e.g., Dun & Bradstreet, Inc.). Accordingly, this third party generated credit score is used as an additional input for the pre-determined formula to calculate the credit risk score. An example of the pre-determined formula is listed in TABLE I (500) of FIG. 5. In the example shown in TABLE I (500) of FIG. 5, each enterprise k corresponds to one of the selected trading partners of the particular business entity, $L_k$, $RL_k$, $P_k$, and $TC_k$ correspond to the aforementioned late portion, excessively late portion, partially paid portion, and complaint portion, respectively of the invoice payment records, and $\alpha$, $\beta$, $\sigma$, and $\mu$ are pre-determined coefficients. For example, these pre-determined coefficients may be used as weighting factors to adjust relative contributions of $L_k$, $RL_k$, $P_k$, and $TC_k$ to the enterprise trade score. As shown in TABLE I (500) of FIG. 5, the enterprise trade score corresponds to the credit risk score discussed above. Although the D&B rating and Moody's credit rating are not explicitly included in the formula for calculating the enterprise trade score, those skilled in the art with the benefit of this disclosure will appreciate that additional terms based on the D&B rating and/or Moody's credit rating may be further included in the formula shown in TABLE I (500).

Figure 3C:
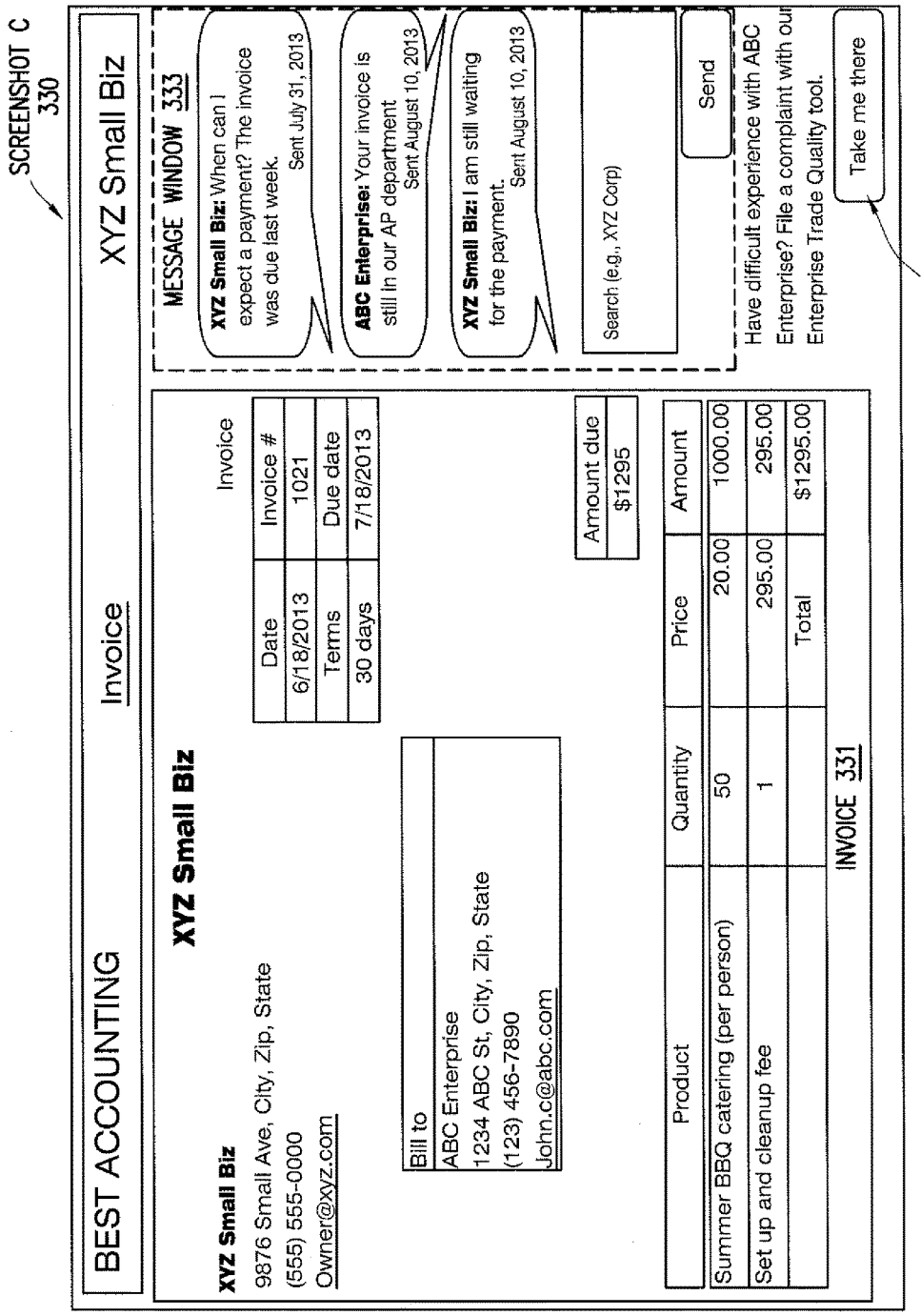

FIGS. 3A, 3B, and 3C show example screenshots of assessing enterprise credit quality in accordance with one or more embodiments of the invention. The application example depicted in FIGS. 3A, 3B, and 3C may be practiced using the system (100) of FIG. 1 and based on the method described with respect to FIG. 2 above. For example, the scenario depicted in FIGS. 3A, 3B, and 3C relates to large enterprises trading with SMBs. Many of these large enterprises and SMBs are users of a SaaS accounting application "BEST ACCOUNTING." In general, the typical invoice payment terms of these transactions range from net 10 to net 45. Some of these large enterprises frequently pay invoices late leaving their SMB partners in tight cash flow situations having no way to predict when payments may be received. Individually, these SMBs do not have much recourse beyond calling the late paying large enterprises' Accounts Payable department repeatedly. They can only do their best to cover their cash flow needs while they wait for these large enterprises' payments.

In the application example depicted in FIGS. 3A, 3B, and 3C, "BEST ACCOUNTING" has the functionality to make enterprise trade quality information available to users based on relevant invoicing data (e.g., invoice, amount, due date, date of actual payment, etc). The users (e.g., SMBs) may then use the enterprise trade quality information to qualify their large enterprise trading partners. And the late paying large enterprise will have an incentive to change payment practices and honor SMB contract terms better.

FIG. 3A shows a screenshot A (310) of "BEST ACCOUNTING" used by a SMB "John's Plumbing Service." Specifically, the screenshot A (310) shows a new customer alert list (311) that pops up when the SMB owner John is reviewing newly received purchase orders, reviewing request-for-quotes (RFQs) from potential customers, or other applicable scenarios when new customers are considered by John. The new customer alert list (311) includes many entries, such as the entry A (312a) that "ABC Enterprise" has a score of 54, and the entry B (312b) reporting that that "Large Technology Corp" has a score of 30. In particular, the alert (313) indicates that has been a recent change in Large Technology Corp's score. As noted above, these scores represent enterprise trade qualities of corresponding business entities.

In response to viewing the new customer alert list (311), John clicks on the entry A (312a) to find out more about ABC enterprise. Accordingly, as shown in FIG. 3B below, a new screen of BEST ACCOUNTING is presented to John.

FIG. 3B shows a screenshot B (320) of BEST ACCOUNTING where enterprise trade quality information of ABC Enterprise is presented to John. Specifically, the screenshot B (320) includes company information (321), credit risk score information (322), credit risk score information detail (323), action menu (324), etc. As shown in FIG. 3B, the company information (321) shows general information of ABC Enterprise, the credit risk score information (322) shows the score and percentile information of ABC enterprise, the credit risk score information detail (323) shows payment delay, payment disputes, and "Dun & Bradstreet" score information of ABC Enterprise, and the action menu (324) shows available actions for John. In particular, the action menu (324) allows John to search the enterprise trade quality information for another company, to share his invoice payment experience with ABC Enterprise if applicable, and to connect with other SMBs to discuss their invoice payment experiences with ABC Enterprise as trade references.

As shown in the credit risk score information details (323), the payment disputes statistics are tracked by BEST ACCOUNTING. An example is shown in FIG. 3C below.

FIG. 3C shows a screenshot C (320) of BEST ACCOUNTING used by another SMB "XYZ Small Biz." Specifically, the screenshot C (330) shows an invoice (331) of XYZ Small Biz that has not been paid by its customer ABC Enterprise. The screenshot C (330) also shows the message window (333) where an accountant of XYZ Small Biz contacts ABC Enterprise to discuss the late payment of the pending invoice. In addition, the screenshot C (330) also shows an action button (332) that this accountant of XYZ Small Biz may file a complaint within the BEST ACCOUNTING user community. The complaint will be included in an invoice payment complaint statistics generated by BEST ACCOUNTING and used in determining the score of ABC Enterprise.

Figure 4:
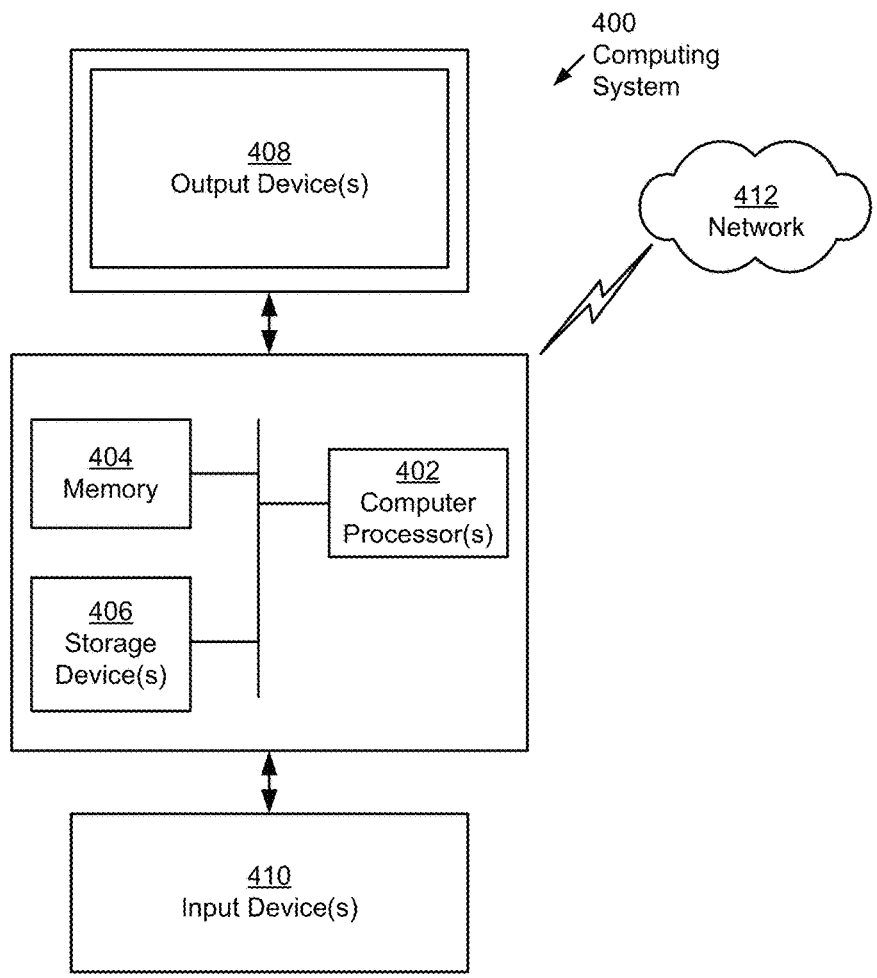
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:

accessing a business management application (BMA) that operates as software as a service (SaaS) and that generates a plurality of invoice payment records based on transactions conducted between a business entity and a plurality of trading partners which are payees of the business entity, wherein the business entity and the plurality of trading partners access the BMA over the Internet;

obtaining, by a credit quality assessment tool executing on a hardware processor, a plurality of pre-determined business activity measures for the plurality of trading partners;

selecting, by comparing the plurality of pre-determined business activity measures with a small business (SMB) threshold, a plurality of selected trading partners, wherein the pre-determined business activity measure of each of the plurality of selected trading partners is less than the SMB threshold;

obtaining, by the credit quality assessment tool and from the BMA over a network connection, only a subset of the plurality of invoice payment records corresponding to transactions conducted between the business entity and the plurality of selected trading partners;

generating, by the credit quality assessment tool, a plurality of invoice payment statistics representing payment behavior of the business entity towards small businesses by analyzing the subset of the plurality of invoice payment records;

generating, by the credit quality assessment tool executing on the hardware processor and using a pre-determined formula, the credit risk score of the business entity based on the plurality of invoice payment statistics; and displaying, to a user associated with a small business, a first graphical user interface (GUI) screen comprising a list comprising:
  a first entry displayed that identifies the business entity and the credit risk score of the business entity; and
  a second entry displayed that identifies a different business entity and a previously determined credit risk score for the different business entity;

displaying, to the user and in response to the user selecting the first entry displayed in the list of the first GUI screen, a second GUI screen comprising:
  a first region comprising displayed company information for the business entity;
  a second region comprising displayed credit risk score information associated with the business entity and the credit risk score for the business entity;
  a third region comprising displayed credit risk score information details for the business entity comprising:
    payment dispute statistics associated with the business entity;
    payment delay statistics associated with the business entity; and
    a third-party credit score of the business entity; and
  an action menu comprising:
    a first button configured to, when activated by the user, improve accuracy of the credit risk score of the business entity by obtaining user input associated with an invoice payment experience involving the business entity; and
    a second button configured to, when activated by the user, allow communication between the user and at least one of the plurality of selected trading partners.

2. The method of claim 1, wherein the plurality of invoice payment statistics comprises:
  a first statistical measure of a late portion of the plurality of invoice payment records having a paid late status based on a pre-determined paid late criterion.

3. The method of claim 2, wherein the plurality of invoice payment statistics further comprises:
  a second statistical measure of an additional late portion of the plurality of invoice payment records having an additional paid late status based on an additional pre-determined paid late criterion.

4. The method of claim 3, wherein the plurality of invoice payment statistics further comprises:
  a third statistical measure of a partially paid portion of the plurality of invoice payment records having a partially paid status based on a pre-determined partially paid criterion.

5. The method of claim 4, wherein the plurality of invoice payment statistics further comprises:
  a fourth statistical measure of a complaint portion of the plurality of invoice payment records having a complaint status based on a pre-determined complaint criterion,
  wherein the fourth statistical measure represents a level of complaints escalation against the business entity.

6. The method of claim 1, further comprising:
  obtaining, from a credit scoring service, the third-party credit score of the business entity,
  wherein generating the credit risk score using the pre-determined formula is further based on the third-party credit score.

7. A system, comprising:
  a business management application (BMA) that operates as software as a service (SaaS) and that generates a plurality of invoice payment records based on transactions conducted between a business entity and a plurality of trading partners which are payees of the business entity,
  wherein the business entity and the plurality of trading partners access the BMA over the Internet;
  a computer processor;
  memory storing instructions executable by the computer processor, wherein the instructions comprise:
    an invoice payment analyzer configured to:
      obtain a plurality of pre-determined business activity measures for the plurality of trading partners;
      select, by comparing the plurality of pre-determined business activity measures with a small business (SMB) threshold, a plurality of selected trading partners,
      wherein the pre-determined business activity measure of each of the plurality of selected trading partners is less than the SMB threshold;
      obtain, from the BMA over a network connection, only a subset of the plurality of invoice payment records corresponding to transactions conducted between the business entity and the plurality of selected trading partners; and
      generate a plurality of invoice payment statistics representing payment behavior of the business entity towards small businesses by analyzing the subset of the plurality of invoice payment records;

a credit risk score generator configured to:
  generate, using a pre-determined formula, the credit risk score of the business entity based on the plurality of invoice payment statistics;
  display, to a user associated with a small business, a first graphical user interface (GUI) screen comprising a list comprising:
    a first entry displayed that identifies the business entity and the credit risk score of the business entity; and
    a second entry displayed that identifies a different business entity and a previously determined credit risk score for the different business entity;
  display, to the user and in response to the user selecting the first entry displayed in the list of the first GUI screen, a second GUI screen comprising:
    a first region comprising displayed company information for the business entity;
    a second region comprising displayed credit risk score information associated with the business entity and the credit risk score for the business entity;
    a third region comprising displayed credit risk score information details for the business entity comprising:
      payment dispute statistics associated with the business entity;
      payment delay statistics associated with the business entity; and
      a third-party credit score of the business entity; and
    an action menu comprising:
      a first button configured to, when activated by the user, improve accuracy of the credit risk score of the business entity by obtaining user input associated with an invoice payment experience involving the business entity; and
      a second button configured to, when activated by the user, allow the user to communicate with at least one of the plurality of selected trading partners; and
  a repository configured to store the plurality of invoice payment statistics and the credit risk score.

8. The system of claim 7, wherein the plurality of invoice payment statistics comprises:
  a first statistical measure of a late portion of the plurality of invoice payment records having a paid late status based on a pre-determined paid late criterion.

9. The system of claim 8, wherein the plurality of invoice payment statistics further comprises:
  a second statistical measure of an additional late portion of the plurality of invoice payment records having an additional paid late status based on an additional pre-determined paid late criterion.

10. The system of claim 9, wherein the plurality of invoice payment statistics further comprises:
  a third statistical measure of a partially paid portion of the plurality of invoice payment records having a partially paid status based on a pre-determined partially paid criterion.

11. The system of claim 10, wherein the plurality of invoice payment statistics further comprises:
  a fourth statistical measure of a complaint portion of the plurality of invoice payment records having a complaint status based on a pre-determined complaint criterion,
  wherein the fourth statistical measure represents a level of complaints escalation against the business entity.

12. The system of claim 7, wherein the credit risk score generator is further configured to:
  obtain, from a credit scoring service, the third-party credit score of the business entity,
  wherein generating the credit risk score using the pre-determined formula is further based on the third-party credit score.

13. A non-transitory computer readable medium storing instructions, the instructions, when executed by a computer processor, comprising functionality for:
  accessing a business management application (BMA) that operates as software as a service (SaaS) and that generates a plurality of invoice payment records based on transactions conducted between a business entity and a plurality of trading partners which are payees of the business entity,
  wherein the business entity and the plurality of trading partners access the BMA over the Internet;
  obtaining a plurality of pre-determined business activity measures for the plurality of trading partners;
  selecting, by comparing the plurality of pre-determined business activity measures with a small business (SMB) threshold, a plurality of selected trading partners,
  wherein the pre-determined business activity measure of each of the plurality of selected trading partners is less than the SMB threshold;
  obtaining, from the BMA over a network connection, only a subset of the plurality of invoice payment records corresponding to transactions conducted between the business entity and the plurality of selected trading partners;
  generating a plurality of invoice payment statistics representing payment behavior of the business entity towards small businesses by analyzing the subset of the plurality of invoice payment records;
  generating, using a pre-determined formula, the credit risk score of the business entity based on the plurality of invoice payment statistics; and
  displaying, to a user associated with a small business, a first graphical user interface (GUI) screen comprising a list comprising:
    a first entry displayed that identifies the business entity and the credit risk score of the business entity; and
    a second entry displayed that identifies a different business entity and a previously determined credit risk score for the different business entity;
  displaying, to the user and in response to the user selecting the first entry displayed in the list of the first GUI screen, a second GUI screen comprising:
    a first region comprising displayed company information for the business entity;
    a second region comprising displayed credit risk score information associated with the business entity and the credit risk score for the business entity;
    a third region comprising displayed credit risk score information details for the business entity comprising:
      payment dispute statistics associated with the business entity;
      payment delay statistics associated with the business entity; and
      a third-party credit score of the business entity; and an action menu comprising:
- a first button configured to, when activated by the user, improve accuracy of the credit risk score of the business entity by obtaining user input associated with an invoice payment experience involving the business entity; and
- a second button configured to, when activated by the user, allow communication between the user and at least one of the plurality of selected trading partners.

14. The non-transitory computer readable medium of claim 13, wherein the plurality of invoice payment statistics comprises:
- a first statistical measure of a late portion of the plurality of invoice payment records having a paid late status based on a pre-determined paid late criterion.

15. The non-transitory computer readable medium of claim 14, wherein the plurality of invoice payment statistics further comprises:
- a second statistical measure of an additional late portion of the plurality of invoice payment records having an additional paid late status based on an additional pre-determined paid late criterion.

16. The non-transitory computer readable medium of claim 15, wherein the plurality of invoice payment statistics further comprises:
- a third statistical measure of a partially paid portion of the plurality of invoice payment records having a partially paid status based on a pre-determined partially paid criterion.

17. The non-transitory computer readable medium of claim 16, wherein the plurality of invoice payment statistics further comprises:
- a fourth statistical measure of a complaint portion of the plurality of invoice payment records having a complaint status based on a pre-determined complaint criterion,
- wherein the fourth statistical measure represents a level of complaints escalation against the business entity.

18. The non-transitory computer readable medium of claim 13, the instructions, when executed by the computer processor, further comprising functionality for:
- obtaining, from a credit scoring service, the third-party credit score of the business entity,
- wherein generating the credit risk score using the pre-determined formula is further based on the third-party credit score.

* * * * *